US008704591B1

(12) United States Patent
Kumar et al.

(10) Patent No.: US 8,704,591 B1
(45) Date of Patent: Apr. 22, 2014

(54) HIGH-VOLTAGE TOLERANT BIASING ARRANGEMENT USING LOW-VOLTAGE DEVICES

(71) Applicant: LSI Corporation, Milpitas, CA (US)

(72) Inventors: Pankaj Kumar, Bangalore (IN); Pramod Parameswaran, Bangalore (IN); Vani Deshpande, Bangalore (IN); Makeshwar Kothandaraman, Bangalore (IN)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/671,808

(22) Filed: Nov. 8, 2012

(51) Int. Cl.
*G06F 1/10* (2006.01)

(52) U.S. Cl.
USPC ............................ 327/545; 327/543; 327/538

(58) Field of Classification Search
USPC ......... 327/537, 530, 535, 538, 540, 541, 543, 327/545
See application file for complete search history.

(56) References Cited

U.S. PATENT DOCUMENTS

| | | | | |
|---|---|---|---|---|
| 5,493,207 | A | 2/1996 | Beasom | |
| 5,534,817 | A * | 7/1996 | Suzuki et al. | 327/545 |
| 6,351,178 | B1 * | 2/2002 | Ooishi et al. | 327/541 |
| 6,859,074 | B2 | 2/2005 | Ajit | |
| 7,830,200 | B2 | 11/2010 | Rao et al. | |
| 2010/0141334 | A1 | 6/2010 | Kumar et al. | |

* cited by examiner

*Primary Examiner* — Lincoln Donovan
*Assistant Examiner* — Jung H Kim
(74) *Attorney, Agent, or Firm* — Otterstedt, Ellenbogen & Kammer, LLP

(57) ABSTRACT

A reference circuit includes an NMOS transistor, a PMOS transistor and a bias circuit. The NMOS transistor includes a source connected with a first voltage supply and a gate adapted to receive a first bias signal. The PMOS transistor includes a source connected with a second voltage supply, a gate adapted to receive a second bias signal, and a drain connected with a drain of the NMOS transistor at an output of the reference circuit. The bias circuit generates the first and second bias signals. Magnitudes the first and second bias signals are configured to control a reference signal generated by the reference circuit such that when the reference signal is near a quiescent value of the reference signal, a current in the reference circuit is below a first level, and when the reference signal is outside of the prescribed limits, the current in the reference circuit increases nonlinearly.

20 Claims, 4 Drawing Sheets

HIGH-VOLTAGE TOLERANT BIASING ARRANGEMENT USING LOW-VOLTAGE DEVICES

BACKGROUND

In many integrated circuit designs, it is often desirable to provide a reference circuit for generating a known bias voltage or current. Reference circuits are generally either non-biased or self-biased. Non-biased circuits rely on discrete voltage drop devices (e.g., resistors or diodes) to arrive at the reference value. An example of a non-biased reference circuit may include a resistor divider, in which a string of resistors are connected together in series between a high voltage supply and a low voltage supply to generate the reference output. A disadvantage of the non-biased circuit is that the current drawn by the circuit is proportional to supply voltage, and that its reference value typically varies widely with the supply voltage level. Self-biased circuits rely on transistor biasing to generate an output reference value that is less sensitive to supply voltage variations. A disadvantage of the self-biased circuit is that the transistor device is susceptible to damage when used in a high-voltage supply application.

Often, the reference output is connected to an input/output (I/O) pad for making the reference voltage available externally. In this scenario, noise can be injected onto the reference output, which is undesirable. When a resistor divider is used to generate the reference output, sensitivity to noise can be reduced by increasing the current in the resistor string. However, this approach has a penalty of increasing power consumption in the reference circuit.

SUMMARY

Embodiments of the invention are broadly related to techniques for generating a reference signal using low-voltage transistor devices in a manner that is suitable for use with a high voltage supply.

In accordance with an embodiment of the invention, a high voltage tolerant reference circuit includes an NMOS transistor, a PMOS transistor and a bias circuit. The NMOS transistor includes a first source/drain adapted for connection with a first voltage supply and a gate adapted to receive a first bias signal. The PMOS transistor includes a first source/drain adapted for connection with a second voltage supply that is lower in magnitude than the first voltage supply, a gate adapted to receive a second bias signal, and a second source/drain connected with a second source/drain of the first NMOS transistor at an output of the reference circuit. The bias circuit is operative to generate the first and second bias signals. A magnitude of each of the first and second bias signals is configured such that when an output reference signal generated at the output of the reference circuit is within prescribed limits of the reference signal, a current in the reference circuit is below a first level, and when the reference signal is outside of the prescribed limits, the current in the reference circuit is greater than a second level.

Embodiments of the invention will become apparent from the following detailed description thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

Figure 1:
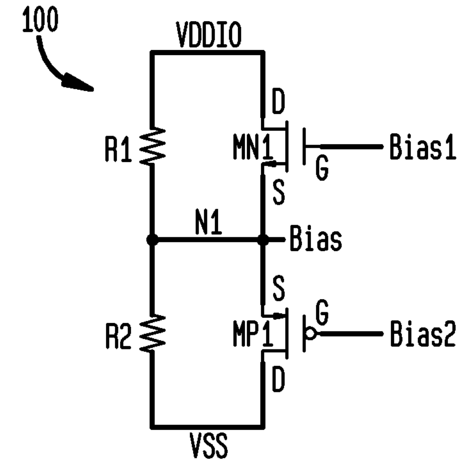
FIG. 1 is a schematic diagram depicting at least a portion of an exemplary reference circuit which can be modified to be incorporated with an embodiment of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the invention will be described herein in the context of illustrative reference circuits for generating an output reference voltage in a manner which reduces power consumption in comparison to conventional biasing approaches, suppresses noise efficiently, and prevents bias walk-through. It should be understood, however, that embodiments of the invention are not limited to these or any other particular circuit arrangements. Rather, embodiments of the invention are more broadly related to techniques for generating a reference signal using low voltage transistor devices that is suitable for use in a high voltage supply environment without compromising circuit reliability, among other benefits. Moreover, it will become apparent to those skilled in the art given the teachings herein that numerous modifications can be made to the embodiments shown that are within the scope of the claimed invention. That is, no limitations with respect to the embodiments shown and described herein are intended or should be inferred.

As a preliminary matter, for the purposes of clarifying and describing embodiments of the invention, the following table provides a summary of certain acronyms and their corresponding definitions, as the terms are used herein:

Table of Acronym Definitions

| Acronym | Definition |
|---|---|
| MOSFET | Metal-oxide-semiconductor field-effect transistor |
| MISFET | Metal-insulator-semiconductor field-effect transistor |
| PMOS | P-channel metal-oxide-semiconductor |
| PFET | P-channel field-effect transistor |
| NMOS | N-channel metal-oxide-semiconductor |
| NFET | N-channel field-effect transistor |
| CMOS | Complementary metal-oxide-semiconductor |

-continued

| Table of Acronym Definitions | |
|---|---|
| Acronym | Definition |
| MOS | Metal-oxide-semiconductor |
| BJT | Bipolar junction transistor |
| SOI | Silicon-on-insulator |
| IC | Integrated circuit |
| I/O | Input/output |
| PVT | Process, supply voltage, and/or temperature |
| IC | Integrated circuit |

For the purpose of describing and claiming embodiments of the invention, the term MOSFET as used herein is intended to be construed broadly and to encompass any type of metal-insulator-semiconductor field-effect transistor (MISFET). The term MOSFET is, for example, intended to encompass semiconductor field-effect transistors that utilize an oxide material as their gate dielectric, as well as those that do not. In addition, despite a reference to the term "metal" in the acronym MOSFET, the term MOSFET is also intended to encompass semiconductor field-effect transistors wherein the gate is formed from a non-metal such as, for instance, polysilicon.

Although embodiments of the present invention described herein may be implemented using p-channel MISFETs (hereinafter called "PMOS" or "PFET" devices) and n-channel MISFETs (hereinafter called "NMOS" or NFET devices), as may be formed using a complementary metal-oxide-semiconductor (CMOS) fabrication process, it is to be appreciated that embodiments of the invention are not limited to such transistor devices and/or such a fabrication process, and that other suitable devices, such as, for example, FinFETs, bipolar junction transistors (BJTs), etc., and/or fabrication processes (e.g., bipolar, BiCMOS, etc.), may be similarly employed, with or without modification to the circuits described herein, as will be understood by those skilled in the art. Moreover, although embodiments of the invention are typically fabricated in a silicon wafer, embodiments of the invention can alternatively be fabricated in wafers comprising other materials, including but not limited to Gallium Arsenide, Indium Phosphide, silicon-on-insulator (SOI), etc.

As previously stated, reference circuits based on a simple resistor divider are commonly employed in a high voltage supply, low-voltage transistor device application for generating a bias voltage. This bias voltage is often used as a source to generate an intermediate voltage which may be used by other circuits external to the reference circuit. Since this bias voltage may be used as a source, and may further interface with an I/O pad, it is likely that noise will be injected into the bias voltage. To reduce the sensitivity of the reference circuit to noise, it is known to increase the current in the resistor divider, for example by reducing the impedance of the resistor string. This approach, however, has an undesirable result of increasing power consumption in the reference circuit.

An important characteristic of a reference circuit is its ability to settle to its nominal dc value (i.e., quiescent point) as quickly as possible, such as within one bit period. A reference circuit that is not able to achieve this design criteria will typically exhibit input data dependent delay, which can lead to excessive jitter. In many conventional reference circuits, when noise is not adequately suppressed in a bit period, a dc shift in the output bias voltage may result, which increases jitter. Additionally, for certain applications in which there exists an alternating pattern of enable and disable states over a relatively long period of time, the output bias voltage starts drifting from its nominal dc value, a phenomenon referred to herein as bias walk-through. Here, the alternating pattern of enable and disable states refers to enabling and disabling of a buffer while an output of the buffer is switching to the same state. In this scenario, noise will couple onto the bias output causing the bias voltage level to drift from its original value. Bias walk-through (or drift) can lead to functional failure and reliability issues, particularly when the output bias voltage level falls outside of prescribed bounds.

FIG. 1 is a schematic diagram depicting at least a portion of a reference circuit 100 which can be incorporated into an embodiment of the invention. Reference circuit 100 comprises an NMOS transistor device, MN1, and a PMOS transistor device, MP1, connected in series between a first voltage source, which may be VDDIO, and a second voltage source, which may be VSS. VDDIO may be a high-voltage I/O supply (e.g., about 3.3 volts) and VSS may be ground (e.g., zero volt), although it is to be understood that embodiments of the invention are not limited to any specific values of the first and second voltage sources. More particularly, a drain (D) of NMOS device MN1 is adapted for connection with VDDIO, a source (S) of MN1 is connected with a source of PMOS device MP1 at node N1, a drain of MP1 is adapted for connection with VSS, a gate (G) of MN1 is adapted to receive a first bias voltage, Bias1, and a gate of MP1 is adapted to receive a second bias voltage, Bias2. The bias voltages Bias1 and Bias2 can be generated from a simple resistor divider, as will become apparent to those skilled in the art.

It is to be appreciated that, because a metal-oxide-semiconductor (MOS) device is symmetrical in nature, and thus bi-directional, the assignment of source and drain designations in the MOS device is essentially arbitrary. Therefore, the source and drain of a given MOS device may be referred to herein generally as first and second source/drain, respectively, where "source/drain" in this context denotes a source or a drain.

The reference circuit 100 further includes a resistor divider connected in parallel with the NMOS and PMOS devices; a first resistor, R1, is connected in parallel with MN1, and a second resistor, R2, is connected in parallel with MP1. Specifically, a first terminal of R1 is adapted for connection with VDDIO, a second terminal of R1 is connected with a first terminal of R2 at node N1, and a second terminal of R2 is adapted for connection with VSS. The resistor divider comprising resistors R1 and R2 serves primarily to set a value of an output reference bias voltage, BIAS, generated at node N1. Devices MN1 and MP1 provide a bounding voltage at node N1, and thus assist in eliminating bias walk-through. As previously stated, however, the resistor divider increases power consumption in the reference circuit 100. Furthermore, node N1 is not substantially constant across variations in process, supply voltage, and/or temperature (PVT) conditions to which the reference circuit 100 is subjected, which is undesirable.

Figure 2:
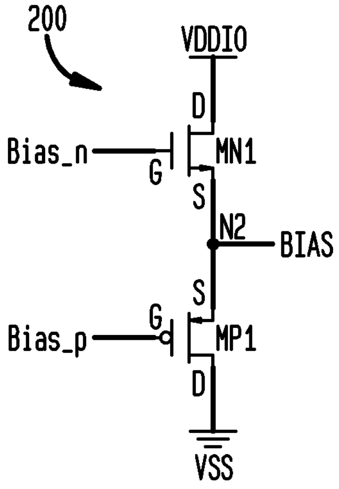
FIG. 2 is a schematic diagram depicting at least a portion of an exemplary reference circuit, according to an embodiment of the invention.

With reference to FIG. 2, a schematic diagram depicts at least a portion of a reference circuit 200, according to an embodiment of the invention. As apparent from FIG. 2, reference circuit 200 is similar to the illustrative reference circuit 100 shown in FIG. 1, except that the resistor divider comprised of series resistors R1 and R2 has been eliminated, thereby significantly reducing power consumption in reference circuit 200. More particularly, reference circuit 200 includes an NMOS transistor MN1 and a PMOS transistor MP1. A drain of MN1 is adapted for connection with a first voltage source, which in this embodiment is I/O voltage supply VDDIO (e.g., about 3.3 volts), a source of MN1 is connected with a source of MP1 at node N2 and forms an output of the reference circuit 200 for generating a reference bias signal, BIAS, a drain of MP1 is adapted for connection with a second voltage source, which in this embodiment is VSS or ground (e.g., zero volt), a gate of MN1 is adapted to receive a first bias signal, Bias_n, and a gate of MP1 is adapted to receive a second bias signal, Bias_p. It is to be understood that embodiments of the invention are not limited to any specific values of the first and second voltage sources VDDIO and VSS, respectively.

In the embodiment shown in FIG. 2, the bias signals Bias_n and Bias_p are not generated from a simple resistor divider, which would otherwise consume significant power. Instead, the bias signals Bias_n and Bias_p are generated using bias circuits configured to provide prescribed signal levels that are appropriately maintained across variations in PVT conditions to which the reference circuit 200 is subjected. Bias signal Bias_n, which provides a gate voltage for NMOS device MN1, is chosen to be an NMOS threshold voltage ($V_{tn}$) above a desired value for the output reference bias signal BIAS (i.e., Bias_n=BIAS+$V_{tn}$) over a prescribed PVT range. Likewise, bias signal Bias_p, which provides a gate voltage for PMOS device MP1, is chosen to be a PMOS threshold voltage ($V_{tp}$) below the desired value for the output reference bias signal BIAS (i.e., Bias_p=BIAS−$V_{tp}$) over the prescribed PVT range. Exemplary bias circuits for generating the bias signals Bias_n and Bias_p will be described in further detail herein below in conjunction with FIGS. 3 and 4, respectively.

Figure 3:
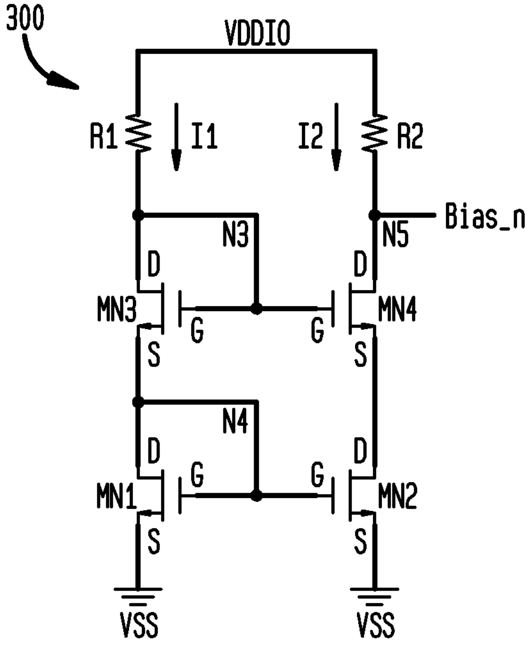
FIG. 3 is a schematic diagram depicting at least a portion of an exemplary n-channel bias circuit suitable for use with the illustrative reference circuit shown in FIG. 2, according to an embodiment of the invention.

FIG. 3 is a schematic diagram depicting at least a portion of an embodiment of an re-channel bias circuit 300 suitable for use with the illustrative reference circuit 200 shown in FIG. 2. Bias circuit 300 is operative to generate the bias signal Bias_n supplied to the NMOS device MN1 in the reference circuit 200 shown in FIG. 2. The bias circuit 300 includes a cascode current mirror configuration for generating Bias_n=BIAS+$V_{tn}$ using low-voltage MOS devices.

As will be appreciated by the skilled artisan, a field-effect-transistor (FET) comprises a gate oxide, which is an insulating layer situated between a gate and a channel region of the transistor. When used in digital logic applications, FETs are often fabricated with what is referred to as a core gate oxide, which, in recent integrated circuit (IC) fabrication technologies, is typically a very thin gate oxide, such as, for example, about 2 nanometers (nm) or less. It is to be appreciated that the thickness of the gate oxide in a thin oxide device is relative, and that what is considered a "thin" gate oxide will generally be dependent upon the geometries of the IC fabrication process employed. Core or thin gate oxide transistors are typically capable of supporting, without damage, only relatively low voltages (e.g., core level voltages), such as, for example, about 1.2 volts (V) or less. A transistor comprising a core gate oxide is often referred to as a low voltage transistor and supports core voltage levels. For example, an illustrative low voltage transistor device has a gate oxide thickness of about 12 Angstrom (1.2 nm) and can support voltage levels ranging from about 0 volts to about 0.945 volts across any two terminals of the device without sustaining measurable damage. More generally, embodiments of the invention allow interfacing with higher supply voltages while using low voltage devices. One non-limiting example would be interfacing with a 3.3-volt supply while using 1.8-volt MOS devices, although embodiments of the invention are not limited to any specific supply or device voltages.

In certain other embodiments, including, for example, some input/output (I/O) buffer and analog circuits, transistors capable of supporting, without damage, higher voltages (e.g., I/O level voltages), such as, for example, about 1.98, 3.63 or 5.5 volts, are required. A transistor capable of supporting these relatively higher I/O level voltages is typically fabricated having what is typically referred to as a thick gate oxide which, in recent technologies, may include devices having gate oxide thicknesses of, for example, about 2.3 nm or greater, and can support voltage levels ranging from about 0 volts to about 1.98 volts. It is to be appreciated that the thickness of the gate oxide in a thick oxide device is relative, and that what is considered a "thick" gate oxide will generally be dependent upon the geometries of the IC fabrication process employed. A transistor comprising a thick gate oxide is often referred to as a high voltage transistor and supports higher I/O voltage levels. Generally, the higher the supported voltage, the thicker the gate oxide that is required. Such transistors having thicker gate oxide, however, inherently have increased parasitic capacitance associated therewith and therefore exhibit slower performance as a trade-off. Many IC fabrication processes provide both low voltage and high voltage transistors.

The maximum voltage associated with a given transistor may be defined as the voltage that the transistor is designed to tolerate without sustaining damage over the intended lifetime of the transistor. Damage to a transistor may be manifested by gate oxide breakdown, substantial increase in gate oxide leakage current, and/or substantial change in a low voltage transistor characteristic, for example, threshold voltage or transconductance, among other factors. Low voltage transistors are often used in core digital logic circuitry and are therefore sometimes referred to as core transistors. High voltage transistors are often used for input, output and I/O buffers and analog applications, and are therefore sometimes referred to as I/O transistors.

The bias circuit 300 includes a first NMOS transistor, MN1, a second NMOS transistor, MN2, a third NMOS transistor, MN3, and a fourth NMOS transistor, MN4. NMOS devices MN1 through MN4 are all low voltage (IO) transistors in this embodiment. A source of MN1 is adapted for connection to a first voltage source, which in this embodiment is VSS or ground (e.g., zero volt), a gate and drain of MN1 are connected with a source of MN3 at node N4, a drain and a gate of MN3 are connected with a first terminal of a first resistor, R1, at node N3, and a second terminal of R1 is adapted for connection with a second voltage supply, which in this embodiment is VDDIO. Thus devices MN1 and MN3 are both connected in a diode configuration. A current, I1, flowing through devices MN1 and MN3 can be controlled as a function of a value of resistor R1.

Likewise, a source of MN2 is adapted for connection with VSS, a gate of MN2 is connected with the gate of MN1 at node N4, a drain of MN2 is connected with a source of MN4, a gate of MN4 is connected with the gate of MN3 at node N3, a drain of MN4 is connected with a first terminal of a second resistor, R2, at node N5 and forms an output of the bias circuit 300 for generating the bias signal Bias_n, and a second terminal of R2 is adapted for connection with VDDIO. With the bias circuit 300 arranged in this manner, a gate-to-source voltage of MN1 will be the same as a gate-to-source voltage of MN2. Ideally, assuming the sizes (effective channel width-to-length ratio (W/L)) of devices MN1 and MN2 are the same and drain voltages of MN1 and MN2 are equal, the current I1 through MN1 will be equal to a current I2 through MN2. Assuming resistors R1 and R2 are the same value, the output bias voltage Bias_n at node N5 will be equal to the voltage at node N3. This voltage will be substantially equal to a gate-to-source voltage of MN1 plus a gate-to-source voltage of MN3, which can be determined using known equations. (See, e.g., P. E. Allen and D. R. Holberg, "CMOS Analog Circuit Design," Holt, Rinehart and Winston, Inc., 1987, the disclosure of which is expressly incorporated herein by reference.)

More particularly, assuming a small current I1 through devices MN1 and MN3, each of the gate-to-source voltages of MN1 and MN3 will be approximately equal to an NMOS threshold voltage $V_{tn}$. Accordingly, the current I1 can be determined using the following expression (with VSS=0):

$$I1 = \frac{VDDIO - 2V_{tn}}{R1} \tag{1}$$

Assuming current I2 in devices MN2 and MN4 is substantially equal to the current I1, the output bias voltage Bias_n can be determined using the following expression:

$$\text{Bias\_}n = \text{VDDIO} - R2 \cdot I1 \tag{2}$$

Substituting equation (1) into equation (2) yields the following:

$$\text{Bias\_n} = VDDIO - \frac{R2}{R1} \cdot (VDDIO - 2V_{tn}) \tag{3}$$

As seen from equation (3), the value of Bias_n can be set as a function of a ratio of resistors R2 and R1. Thus, for example, if R2/R1 is set to 0.5 (i.e., the resistance of R1 is twice that of R2), then $$\begin{aligned} \text{Bias\_n} &= VDDIO - (0.5 \cdot VDDIO - V_{tn}) \\ &= \frac{VDDIO}{2} + V_{tn} \end{aligned} \tag{4}$$

If the desired output reference signal BIAS generated by the illustrative reference circuit 200 shown in FIG. 2 is chosen to be VDDIO/2, for example, then equation (4) above reduces to Bias_n=BIAS+$V_{tn}$, which is consistent with a previously stated design objective for generating a bias signal Bias_n having a magnitude that is about an NMOS threshold voltage above a mid-point between VDDIO and VSS.

Figure 4:
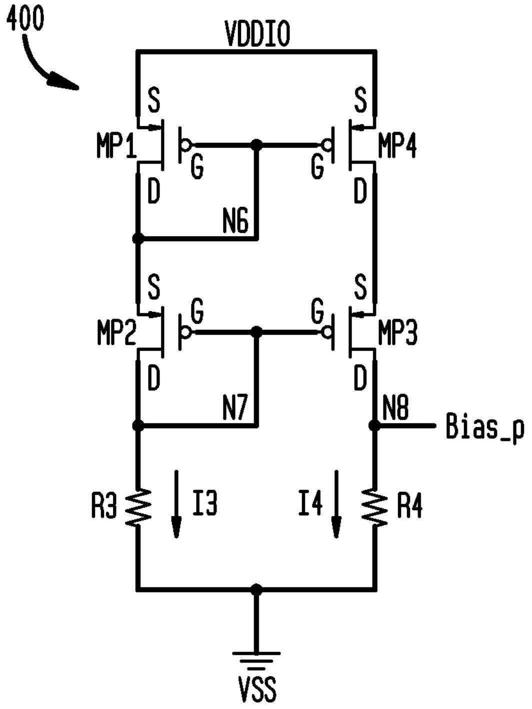
FIG. 4 is a schematic diagram depicting at least a portion of an exemplary p-channel bias circuit suitable for use with the illustrative reference circuit shown in FIG. 2, according to an embodiment of the invention.

Similarly, FIG. 4 is a schematic diagram depicting at least a portion of an exemplary p-channel bias circuit 400 suitable for use with the illustrative reference circuit 200 shown in FIG. 2, according to an embodiment of the invention. Bias circuit 400 is operative to generate the bias signal Bias_p supplied to the PMOS device MP1 in the reference circuit 200 shown in FIG. 2. In order to provide a high-voltage tolerant arrangement, the bias circuit 400, like bias circuit 300 shown in FIG. 3, includes a cascode current mirror configuration using low-voltage MOS devices.

The bias circuit 400 comprises a first PMOS transistor, MP1, a second PMOS transistor, MP2, a third PMOS transistor, MP3, and a fourth PMOS transistor, MP4. PMOS devices MP1 through MP4 are all low voltage transistors in this embodiment. A source of MP1 is adapted for connection to a first voltage source, which in this embodiment is VDDIO, a gate and drain of MP1 are connected with a source of MP2 at node N6, a drain and a gate of MP2 are connected with a first terminal of a first resistor, R3, at node N7, and a second terminal of R3 is adapted for connection with a second voltage supply, which in this embodiment is VSS or ground. Thus devices MP1 and MP2 are both connected in a diode configuration. A current, I3, flowing through devices MP1 and MP2 can be controlled as a function of a value of resistor R3.

Likewise, a source of MP4 is adapted for connection with VDDIO, a gate of MP4 is connected with the gate of MP1 at node N6, a drain of MP4 is connected with a source of MP3, a gate of MP3 is connected with the gate of MP2 at node N7, a drain of MP3 is connected with a first terminal of a second resistor, R4, at node N8 and forms an output of the bias circuit 400 for generating the bias signal Bias_p, and a second terminal of R4 is adapted for connection with VSS. With the bias circuit 400 arranged in this manner, a gate-to-source voltage of MP1 will be the same as a gate-to-source voltage of MP4. Ideally, assuming the sizes of devices MP1 and MP4 are the same and drain voltages of MP1 and MP4 are equal, the current I3 through MP1 will be equal to a current I4 through MP4. Assuming resistors R3 and R4 are the same value, the output bias voltage Bias_p at node N8 will be equal to the voltage at node N7. This voltage will be substantially equal to a gate-to-source voltage of MP1 plus a gate-to-source voltage of MP2, which can be determined using known equations.

Assuming a small current I3 through devices MP1 and MP2, each of the gate-to-source voltages of MP1 and MP2 will be approximately equal to a PMOS threshold voltage $V_{tp}$. Accordingly, the current I3 can be determined using the following expression (with VSS=0):

$$I3 = \frac{VDDIO - 2V_{tp}}{R3} \tag{5}$$

Assuming current I4 in devices MP3 and MP4 is substantially equal to the current I3, the output bias voltage Bias_p can be determined using the following expression:

$$\text{Bias\_}p = R4 \cdot I3 \tag{6}$$

Substituting equation (5) into equation (6) yields the following:

$$\text{Bias\_p} = \frac{R4}{R3} \cdot (VDDIO - 2V_{tp}) \tag{7}$$

As seen from equation (7), the value of Bias_p can be set as a function of a ratio of resistors R4 and R3. Thus, for example, if R4/R3 is set to 0.5 (i.e., the resistance of R3 is twice that of R4), then $$\begin{aligned} \text{Bias\_p} &= 0.5 \cdot (VDDIO - 2V_{tp}) \\ &= \frac{VDDIO}{2} - V_{tp} \end{aligned} \tag{8}$$

Using the same value for the output reference signal BIAS generated by the illustrative reference circuit 200 shown in FIG. 2 as chosen above, namely, VDDIO/2, then equation (8) reduces to Bias_p=BIAS−$V_{tp}$. Again, this is consistent with a previously stated design objective for the reference circuit for generating a bias signal Bias_p having a magnitude that is about a PMOS threshold voltage below a mid-point between VDDIO and VSS.

Figure 5:
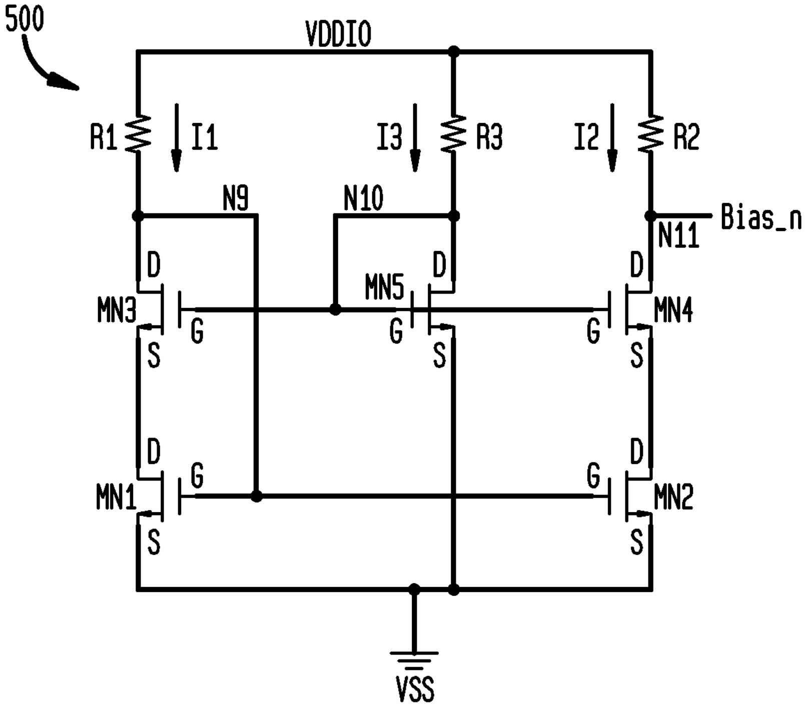
FIG. 5 is a schematic diagram depicting at least a portion of an exemplary high-swing n-channel bias circuit suitable for use with the illustrative reference circuit shown in FIG. 2, according to an embodiment of the invention.

It is to be appreciated that the bias circuits 300 and 400 shown in FIGS. 3 and 4, respectively, are merely illustrative, and that other bias circuit arrangements are similarly contemplated by embodiments of the invention. For example, FIG. 5 is a schematic diagram depicting at least a portion of an exemplary high-swing n-channel bias circuit 500 suitable for use with the illustrative reference circuit 200 shown in FIG. 2, according to an embodiment of the invention. Like the bias circuit 300 shown in FIG. 3, bias circuit 500 utilizes a cascode current mirror arrangement and is therefore high voltage tolerant. However, the cascode arrangement of bias circuit 500 is configured as a high-swing cascode current mirror, which beneficially extends the operational voltage supply range of the bias circuit 500. A similar circuit arrangement can be employed in place of the bias circuit 400 shown in FIG. 4, as will become apparent to those skilled in the art given the teachings herein.

Specifically, bias circuit 500 comprises a first NMOS device, MN1, a second NMOS device, MN2, a third NMOS device, MN3, a fourth NMOS device, MN4, and a fifth NMOS device, MN5. Devices MN1 through MN5 are all low voltage transistors. Sources of devices MN1 and MN2 are adapted for connection with a first voltage supply, which in this embodiment is VSS or ground. A gate of MN1 is connected with a gate of MN2 and a drain of device MN3 at node N9, a drain of MN1 is connected with a source of MN3, and the drain of MN3 at node N9 is adapted for connection with a second voltage supply, which in this embodiment is VDDIO, through a first resistor, R1. A drain of MN2 is connected with a source of device MN4, and a gate of MN4 is connected with a gate and drain of device MN5 (configured in a diode arrangement) and a gate of MN3 at node N10. A drain of MN4 is connected with a first terminal of a second resistor, R2, at node N11 and forms an output of the bias circuit 500 for generating the bias signal Bias_n, and a second terminal of R2 is adapted for connection with VDDIO. The drain and gate of MN5 are adapted for connection with VDDIO through a third resistor, R3. In the bias circuit 500, MN5 functions primarily to bias MN3 and MN4 so that the drain voltage of MN4 at node N11 is not limited to $2V_{tn}$. Currents I1, I2 and I3 can be controlled as a function of the values of resistors R1, R2 and R3, respectively.

The exemplary reference circuit 200 shown in FIG. 2, in conjunction with the illustrative bias circuits 300 and 400 depicted in FIGS. 3 and 4, respectively, exhibits a reduced output impedance (with devices MN1 and MP1 configured in the manner shown in FIG. 2 as source followers) which thereby beneficially suppresses noise. Furthermore, the bias signals Bias_n and Bias_p used to set the bias points of MN1 and MP1 in FIG. 2 are generated in a manner which provides a stable output reference signal BIAS across a prescribed range of PVT conditions to which the reference circuit 200 may be subjected.

Figure 6:
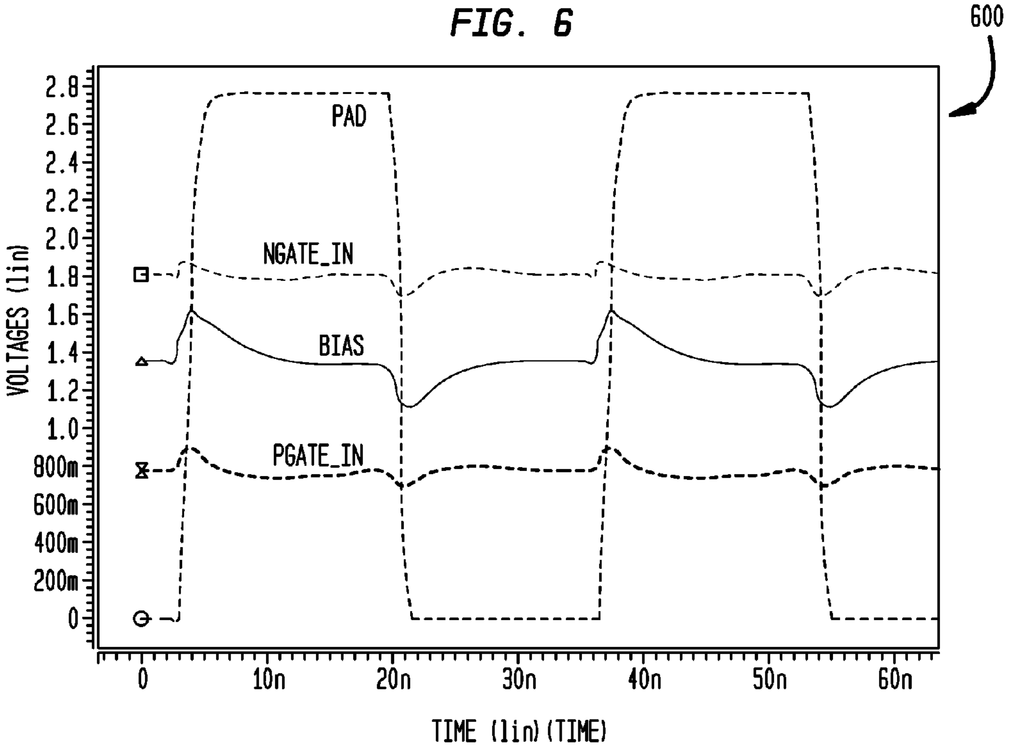
FIG. 6 is a graph depicting exemplary waveforms generated in connection with the illustrative bias circuit shown in FIG. 2, according to an embodiment of the invention.

FIG. 6 is a graph 600 depicting exemplary waveforms generated in connection with the illustrative bias circuit 200 shown in FIG. 2, according to an embodiment of the invention. Although not explicitly labeled in FIG. 2, the waveform labeled PAD is indicative of an output of a driver cell or alternative output circuit. As apparent from FIG. 6, BIAS has maximum noise whenever PAD toggles from one state to another. The waveforms NGATE_IN and PGATE_IN represent the bias signals Bias_n and Bias_p supplied to the devices MN1 and MP1, respectively, in reference circuit 200. As apparent from FIG. 6, the output reference signal BIAS generated by the reference circuit 200 (FIG. 2) varies from about 1.10 volts to about 1.62 volts as the signal PAD switches between 0 and about 2.75 volts.

Figure 7:
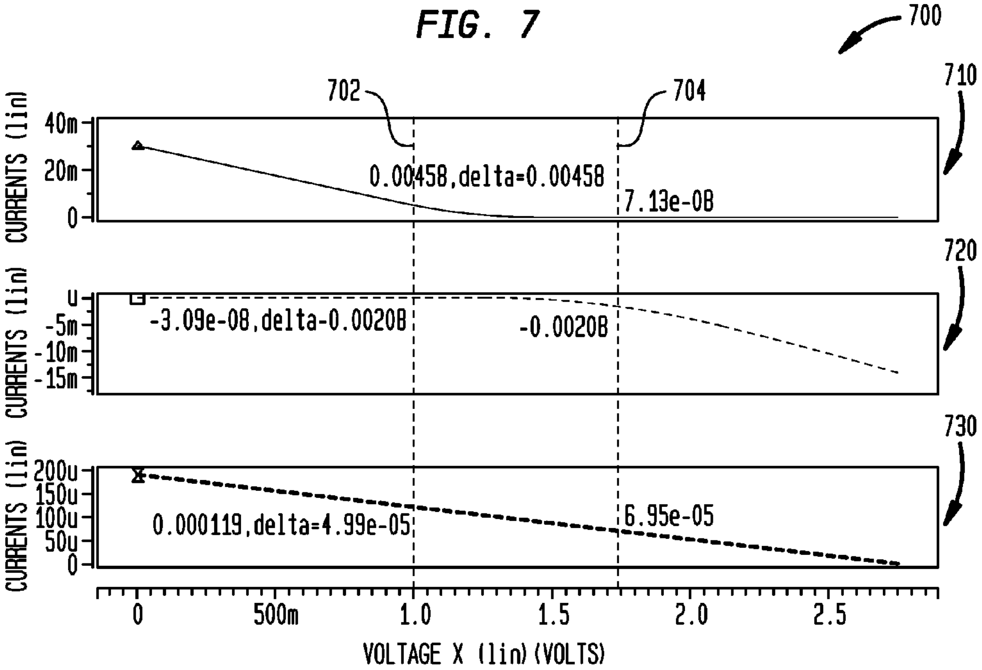
FIG. 7 is a graph depicting exemplary waveforms comparing an electrical performance of the illustrative reference circuit shown in FIG. 2 with a simple resistor divider circuit.

FIG. 7 is a graph 700 depicting exemplary waveforms comparing an electrical performance of the embodiment illustrated in reference circuit 200 shown in FIG. 2 with a simple resistor divider circuit. More particularly, FIG. 7 shows how the embodiment illustrated in reference circuit 200 bounds the bias voltage (BIAS) compared to a simple resistor divider circuit. The two top panels, 710 and 720, correspond to the embodiment illustrated in reference circuit 200, while the bottom panel, 730, corresponds to a simple resistor divider circuit. In FIG. 7, the x-axis represents the voltage BIAS (in volts) which is swept from zero to VDDIO (about 2.75 volts in this embodiment), while the y-axis in each panel indicates current (in amperes) corresponding to the reference circuit. Two boundaries are included on the graph 700. A first boundary, 702, represents a BIAS voltage of 1.01 volts and a second boundary, 704, represents a BIAS voltage of 1.74 volts, which is roughly ±350 millivolts from a prescribed BIAS voltage of 1.37 volts. This BIAS voltage of 1.37 volts is indicative of setting the BIAS voltage to a desired VDDIO/2, where VDDIO is assumed to be 2.75 volts.

In panel 710, it is shown that if BIAS decreases below about 1.01V (boundary 702), then the current through MN1 in the reference circuit 200 of FIG. 2 increases exponentially in the milliampere range. Similarly, panel 720 shows that if BIAS increases above about 1.74V (boundary 704), then the current through MP1 in the reference circuit 200 of FIG. 2 increases exponentially into the milliampere range. Hence, in either case, the reference circuit 200 is operative to supply significant current to compensate (i.e., suppress) noise and maintain BIAS at its prescribed level.

As previously stated, the resistor divider architecture uses a passive resistor division to generate the output reference voltage BIAS, and thus the resistor divider circuit exhibits a linear trend, as evidenced in panel 730. Specifically, when BIAS is beyond the boundaries 702, 704, the simple resistor divider circuit only generates about 100 microamperes of current. Consequently, the resistor divider circuit cannot generate sufficient current to suppress noise for maintaining BIAS at its prescribed level.

According to embodiments of the invention, the reference circuit 200, in comparison to the simple resistor divider circuit, consumes less current within the prescribed boundaries 702, 704, thereby conserving power, and yet is able to generate significantly greater current outside the boundaries as needed to facilitate noise suppression.

At least a portion of the embodiments of the invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

An integrated circuit in accordance with embodiments of the invention can be employed in essentially any application and/or electronic system in which a reference signal is used. Suitable applications and systems for implementing techniques according to embodiments of the invention may include, but are not limited to, reference generation, voltage level shifting, etc. Systems incorporating such integrated circuits are considered part of embodiments of the invention. Given the teachings of embodiments of the invention provided herein, one of ordinary skill in the art will be able to contemplate other implementations and applications of the techniques of embodiments of the invention.

The embodiments of the invention described herein are intended to provide a general understanding of the various embodiments, and are not intended to serve as a complete description of all the elements and features of apparatus and systems that might make use of the structures described herein. Other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other embodiments of the invention. Although embodiments of the invention have been described herein with reference to the accompanying drawings, it is to be understood that embodiments of the invention are not limited to the described embodiments, and that various other embodiments within the scope of the following claims will be apparent to those skilled in the art given the teachings herein.

What is claimed is:

1. A high-voltage tolerant reference circuit, comprising:

a first NMOS transistor including a first source/drain adapted for connection with a first voltage supply and a gate adapted to receive a first bias signal;

a first PMOS transistor including a first source/drain adapted for connection with a second voltage supply that is lower in magnitude than the first voltage supply, a gate adapted to receive a second bias signal, and a second source/drain connected with a second source/drain of the first NMOS transistor at an output of the reference circuit; and a bias circuit operative to generate the first and second bias signals, a magnitude of each of the first and second bias signals being configured to control a magnitude of a reference signal generated at the output of the reference circuit such that when the reference signal is within prescribed limits of a quiescent value of the reference signal, a magnitude of a current in the reference circuit is below a first level, and when the reference signal is outside of the prescribed limits, the magnitude of the current in the reference circuit increases nonlinearly to thereby restore the magnitude of the reference signal to within the prescribed limits of its quiescent value.

2. A high-voltage tolerant reference circuit, comprising:

a first NMOS transistor including a first source/drain adapted for connection with a first voltage supply and a gate adapted to receive a first bias signal;

a first PMOS transistor including a first source/drain adapted for connection with a second voltage supply that is lower in magnitude than the first voltage supply, a gate adapted to receive a second bias signal, and a second source/drain connected with a second source/drain of the first NMOS transistor at an output of the reference circuit; and a bias circuit operative to generate the first and second bias signals, a magnitude of each of the first and second bias signals being configured to control a magnitude of a reference signal generated at the output of the reference circuit such that when the reference signal is within prescribed limits of a quiescent value of the reference signal, a magnitude of a current in the reference circuit is below a first level, and when the reference signal is outside of the prescribed limits, the magnitude of the current in the reference circuit increases nonlinearly to thereby restore the magnitude of the reference signal to within the prescribed limits of its quiescent value;

wherein the bias circuit comprises a first cascode current mirror operative to generate the first bias signal and a second cascode current mirror operative to generate the second bias signal.

3. The reference circuit of claim 2, wherein the first cascode current mirror comprises:

second, third, fourth, and fifth NMOS transistors, a first source/drain of the second and third NMOS transistors being adapted for connection with the second voltage supply, a gate and a second source/drain of the second NMOS transistor being connected with a gate of the third NMOS transistor, a first source/drain of the fourth NMOS transistor being connected with the second source/drain of the second NMOS transistor, a gate and a second source/drain of the fourth NMOS transistor being connected with a gate of the fifth NMOS transistor, a first source/drain of the fifth NMOS transistor being connected with a second source/drain of the third NMOS transistor; and first and second resistors, a first terminal of the first resistor being connected with the second source/drain of the fourth NMOS transistor, a second terminal of the first resistor being adapted for connection with the first voltage supply, a first terminal of the second resistor being connected with a second source/drain of the fifth NMOS transistor and forming an output of the first cascode current mirror for generating the first bias signal, and a second terminal of the second resistor being adapted for connection with the first voltage supply.

4. The reference circuit of claim 3, wherein a magnitude of the first bias signal is a function of a ratio of the first and second resistors.

5. The reference circuit of claim 2, wherein the second cascode current mirror comprises:

second, third, fourth, and fifth PMOS transistors, a first source/drain of the second and third PMOS transistors being adapted for connection with the first voltage supply, a gate and a second source/drain of the second PMOS transistor being connected with a gate of the third PMOS transistor, a first source/drain of the fourth PMOS transistor being connected with the second source/drain of the second PMOS transistor, a gate and a second source/drain of the fourth PMOS transistor being connected with a gate of the fifth PMOS transistor, a first source/drain of the fifth PMOS transistor being connected with a second source/drain of the third PMOS transistor; and first and second resistors, a first terminal of the first resistor being connected with the second source/drain of the fourth PMOS transistor, a second terminal of the first resistor being adapted for connection with the second voltage supply, a first terminal of the second resistor being connected with a second source/drain of the fifth PMOS transistor and forming an output of the second cascode current mirror for generating the second bias signal, and a second terminal of the second resistor being adapted for connection with the second voltage supply.

6. The reference circuit of claim 5, wherein a magnitude of the second bias signal is a function of a ratio of the first and second resistors.

7. The reference circuit of claim 2, wherein the first cascode current mirror comprises:

second, third, fourth, fifth and sixth NMOS transistors, a first source/drain of the second, third and fourth NMOS transistors being adapted for connection with the first voltage supply, a gate of the second NMOS transistor being connected with a gate of the third NMOS transistor, a second source/drain of the second NMOS transistor being connected with a first source/drain of the fifth NMOS transistor, a second source/drain of the third NMOS transistor being connected with a first source/drain of the sixth NMOS transistor, a gate and a second source/drain of the fourth NMOS transistor being connected with gates of the fifth and sixth NMOS transistors, respectively, the gate of the second NMOS transistor being connected with a second source/drain of the fifth NMOS transistor; and first, second and third resistors, a first terminal of each of the first, second and third resistors being adapted for connection with the second voltage supply, a second terminal of the first resistor being connected with the second source/drain of the fifth NMOS transistor, a second terminal of the second resistor being connected with a second source/drain of the sixth NMOS transistor and forming an output of the first cascode current mirror for generating the first bias signal, and a second terminal of the third resistor being connected with the second source/drain of the fourth NMOS transistor.

8. The reference circuit of claim 2, wherein the second cascode current mirror comprises:

second, third, fourth, fifth and sixth PMOS transistors, a first source/drain of the second, third and fourth PMOS transistors being adapted for connection with the second voltage supply, a gate of the second PMOS transistor being connected with a gate of the third PMOS transistor, a second source/drain of the second PMOS transistor being connected with a first source/drain of the fifth PMOS transistor, a second source/drain of the third PMOS transistor being connected with a first source/drain of the sixth PMOS transistor, a gate and a second source/drain of the fourth PMOS transistor being connected with gates of the fifth and sixth PMOS transistors, respectively, the gate of the second PMOS transistor being connected with a second source/drain of the fifth PMOS transistor; and first, second and third resistors, a first terminal of each of the first, second and third resistors being adapted for connection with the first voltage supply, a second terminal of the first resistor being connected with the second source/drain of the fifth PMOS transistor, a second terminal of the second resistor being connected with a second source/drain of the sixth PMOS transistor and forming an output of the second cascode current mirror for generating the second bias signal, and a second terminal of the third resistor being connected with the second source/drain of the fourth PMOS transistor.

9. The reference circuit of claim 2, wherein a magnitude of the reference signal is configured to be about half a difference between the first and second voltage supplies over a prescribed range of process, supply voltage and temperature conditions to which the reference circuit is subjected.

10. The reference circuit of claim 2, wherein a magnitude of the first bias signal is configured to be about an NMOS threshold voltage above a mid-point between the first and second voltage supplies over a prescribed range of process, supply voltage and temperature conditions to which the reference circuit is subjected.

11. The reference circuit of claim 2, wherein a magnitude of the second bias signal is configured to be about a PMOS threshold voltage below a mid-point between the first and second voltage supplies over a prescribed range of process, supply voltage and temperature conditions to which the reference circuit is subjected.

12. The reference circuit of claim 2, wherein each of the first NMOS and PMOS transistors are low voltage transistors.

13. The reference circuit of claim 2, wherein the magnitude of each of the first and second bias signals is configured to control the reference signal such that the magnitude of the current in the reference circuit increases nonlinearly when the reference signal changes from its quiescent value.

14. The reference circuit of claim 2, wherein the bias circuit is operative to control the respective magnitudes of the first and second bias signals such that when the magnitude of the reference signal is outside of the prescribed limits of its quiescent value, the current in the reference circuit increases exponentially.

15. The reference circuit of claim 2, wherein at least a portion of the reference circuit is fabricated in at least one integrated circuit.

16. An electronic system, comprising:

at least one integrated circuit, the at least one integrated circuit including at least one high voltage tolerant reference circuit, the at least one high voltage tolerant reference circuit comprising:

a first NMOS transistor including a first source/drain adapted for connection with a first voltage supply and a gate adapted to receive a first bias signal;

a first PMOS transistor including a first source/drain adapted for connection with a second voltage supply that is lower in magnitude than the first voltage supply, a gate adapted to receive a second bias signal, and a second source/drain connected with a second source/drain of the first NMOS transistor at an output of the reference circuit; and a bias circuit operative to generate the first and second bias signals, a magnitude of each of the first and second bias signals being configured to control a magnitude of a reference signal generated at the output of the reference circuit such that when the reference signal is within prescribed limits of a quiescent value of the reference signal, a magnitude of a current in the reference circuit is below a first level, and when the reference signal is outside of the prescribed limits, the magnitude of the current in the reference circuit increases nonlinearly to thereby restore the magnitude of the reference signal to within the prescribed limits of its quiescent value;

wherein the bias circuit comprises a first cascode current mirror operative to generate the first bias signal and a second cascode current mirror operative to generate the second bias signal.

17. The system of claim 16, wherein the first cascode current mirror comprises:

second, third, fourth, and fifth NMOS transistors, a first source/drain of the second and third NMOS transistors being adapted for connection with the second voltage supply, a gate and a second source/drain of the second NMOS transistor being connected with a gate of the third NMOS transistor, a first source/drain of the fourth NMOS transistor being connected with the second source/drain of the second NMOS transistor, a gate and a second source/drain of the fourth NMOS transistor being connected with a gate of the fifth NMOS transistor, a first source/drain of the fifth NMOS transistor being connected with a second source/drain of the third NMOS transistor; and first and second resistors, a first terminal of the first resistor being connected with the second source/drain of the fourth NMOS transistor, a second terminal of the first resistor being adapted for connection with the first voltage supply, a first terminal of the second resistor being connected with a second source/drain of the fifth NMOS transistor and forming an output of the first cascode current mirror for generating the first bias signal, and a second terminal of the second resistor being adapted for connection with the first voltage supply.

18. The system of claim 17, wherein a magnitude of the first bias signal is a function of a ratio of the first and second resistors.

19. The system of claim 16, wherein the second cascode current mirror comprises:

second, third, fourth, and fifth PMOS transistors, a first source/drain of the second and third PMOS transistors being adapted for connection with the first voltage supply, a gate and a second source/drain of the second PMOS transistor being connected with a gate of the third PMOS transistor, a first source/drain of the fourth PMOS transistor being connected with the second source/drain of the second PMOS transistor, a gate and a second source/drain of the fourth PMOS transistor being connected with a gate of the fifth PMOS transistor, a first source/drain of the fifth PMOS transistor being connected with a second source/drain of the third PMOS transistor; and first and second resistors, a first terminal of the first resistor being connected with the second source/drain of the fourth PMOS transistor, a second terminal of the first resistor being adapted for connection with the second voltage supply, a first terminal of the second resistor being connected with a second source/drain of the fifth PMOS transistor and forming an output of the second cascode current mirror for generating the second bias signal, and a second terminal of the second resistor being adapted for connection with the second voltage supply.

20. The reference circuit of claim 19, wherein a magnitude of the second bias signal is a function of a ratio of the first and second resistors.

* * * * *